July 7, 1936.   O. W. PENDERGAST   2,046,924

ADHESIVE ARTICLE AND METHOD OF MANUFACTURING AN ADHESIVE

Filed Oct. 11, 1932

INVENTOR.

Overton W. Pendergast

BY

ATTORNEYS.

Patented July 7, 1936

2,046,924

UNITED STATES PATENT OFFICE 2,046,924

ADHESIVE ARTICLE AND METHOD OF MANUFACTURING AN ADHESIVE

Overton W. Pendergast, Terre Haute, Ind.

Application October 11, 1932, Serial No. 637,332

11 Claims. (Cl. 41—33)

This invention relates to methods of manufacturing adhesives and uses for said adhesives and to the manufacture of an adhesive more particuarly adapted to a sensitive-to-pressure use and the employment of the same in the production of articles of manufacture.

In many of the arts it is desirable to employ an adhesive which will not require the application of a moistener, such as water, to the adhesive in order to cause its carrier to adhere to a surface. Also, it is desirable to have an adhesive of the kind just described, which may be applied as a coating to a carrier and by the application of pressure only will cause the carrier to adhere to a supporting surface, but may be easily peeled or removed from that surface, leaving no indication of its presence on said surface, and may be reapplied to other similar surfaces with the same results. In addition, it is desirable, particularly in the printing art, to be able to provide an adhesive which may be printed upon or similarly treated, while sensitive to pressure, without causing the adhesive to adhere to the type or other imprinting means and which will satisfactorily carry the impressed ink or other medium. A carrier coated with such an adhesive and imprinted with suitable indicia would be very desirable used as a temporary or permanent label or sign to be affixed to automobile windshields, show windows, show cases, bottles, jars and the like.

An object of this invention is to provide a method of manufacture of an adhesive which adhesive when so manufactured, may be employed to coat material adapted to be handled extensively such as in counting, jogging, press feeding, bundling and the like.

Another object is to provide a method for the production of an anti-tacky adhesive which adhesive, when so produced, will leave no residue on the surface to which its carrier is applied, including surfaces which are affected by heat and cold, such as glass which may be subjected to the sun rays or to cold winds.

Another object is to provide a method of manufacture of a sensitive-to-pressure adhesive which adhesive will cause its carrier, such as paper and the like, to adhere to a highly polished surface such as glass, but will not cause its carrier to adhere to another sheet of paper or the like.

Another object is to provide a method of producing a sensitive-to-pressure adhesive which adhesive will permit its carrier such as paper, cloth, or the like, to be applied, removed and reapplied almost indefinitely to a highly polished surface such as glass.

Still another object of the invention is to provide a method of manufacturing such an adhesive which adhesive, when so manufactured, will not cause its carrier to warp or curl when applied or when the adhesive is subjected to atmospheric changes.

Another object is to provide a method of manufacturing an adhesive which adhesive, when so manufactured may be applied to carriers such as two sheets of paper, the adhesive-applied surfaces thereupon pressed together and which adhesive will cause the two sheets to mutually adhere until peeled apart, whereupon the adhesive will present a smooth surface.

Still another object is to provide an adhesive manufacturing method which adhesive may be printed upon or similarly treated and will not come away upon the imprinting instrument nor cause the printing ink or similar substance to run.

Another important object is the provision of a method of manufacturing an adhesive which adhesive requires the application of no water, in order to cause it to adhere to a surface.

Still another object is to provide a manufacturing method for an adhesive which adhesive, when so manufactured will form a coating so tough and strong that the carrier employed may be relatively weak, light weight, and the like.

Yet another object is to provide an adhesive forming a coating on a carrier, which carrier may be removed with water by rubbing or the like, and the coating itself will be capable of manipulation as set out above.

Another object is to provide an article of manufacture comprising a carrier such as paper, cardboard, cloth and the like, coated with a sensitive-to-pressure adhesive capable of being printed upon either on its coated or uncoated surface.

Another object is to provide an article of manufacture comprising a carrier as above which when coated with a sensitive-to-pressure adhesive may be applied by pressure to a smooth surface, such as glass, and will adhere, but may be easily removed by peeling from the glass leaving no parts adhering thereto and may be reapplied and removed as often as desired.

Another object is to provide an article of manufacture comprising a pair of carriers each coated on one face with an adhesive and which coated faces may be pressed together rendering the opposite faces capable of being printed upon or similarly treated, preparatory to separating the two carriers and affixing them to suitable supports by the employment of the adhesive initially provided to hold the two carriers together.

Another important object is to provide an article of manufacture comprising a pair of carriers each coated on one face with an adhesive and which coated faces may be pressed together whereby dust, etc., will be excluded from the adhering surfaces and the outer faces may be printed upon or similarly treated, preparatory to separating the two carriers and affixing them to suitable supports by the employment of the adhesive initially provided to hold the carriers together.

Another object is to provide a method of transferring prints to a suitable surface which prints are capable of being readily peeled from such surface in their entirety.

Other objects and advantages of the invention will be apparent during the course of the following detailed description, taken in connection with the accompanying drawing, forming a part of this specification and in which drawing:—

In the drawing, wherein similar reference characters designate corresponding parts thruout the several views, the letter A designates generally an adhesive, B a carrier therefor, C imprinting upon the carrier or adhesive, and D a supporting surface.

Figure 1:
Figure 1 is a plan view of an adhesive-coated face of an imprinted carrier as viewed thru a transparency.

The improved adhesive A is composed of a mixture of a cellulose ester in a suitable vehicle or solvent and a vegetable oil or gum such as castor oil or camphor.

The cellulose ester is preferably cellulose nitrate (nitrocellulose) altho cellulose acetate (sericose) may be employed, both being insoluble in water. As to cellulose nitrate, it is preferred to employ what is commonly known as 30 second cellulose nitrate. The vehicle or solvent is preferably a quickly evaporable or dissipatable one and the preferred solvent comprises butyl acetate 25 per cent by volume, butanol 10 per cent by volume, ethyl acetate 10 per cent by volume, ethyl alcohol 5 per cent by volume, toluol 50 per cent by volume. This solvent is chemically inert toward castor oil but while the cellulose nitrate will not dissolve in alcohol alone (and for that reason the several compounds named above are preferably employed to provide for the satisfactory dissolution of the cellulose nitrate), the castor oil will dissolve in alcohol and thus be well mixed in the resulting adhesive.

As for the vegetable oil, the one commonly known as castor oil or ricinus oil is preferably employed, and in a substantially chemically pure condition. Not only does the employment of castor oil give the sensitive-to-pressure qualities to the adhesive but it also prevents the carrier, if of paper, from drawing and warping and keeps the adhesive just in the most satisfactory condition so that it will not be tacky (by which term it should be understood that the adhesive will not separate in a stringy manner from a suitable supporting surface when peeled therefrom nor will it adhere to printers' type and the like) but will present a smooth surface even when two faces of the adhesive are brought into contact one with the other and then drawn apart (peeled from each other).

In preparing the adhesive, the cellulose ester and solvent are mixed together and the third ingredient mixed with a certain part of the resultant solution.

The preferred formula comprises, $8\frac{1}{3}$ parts by volume of 30 second cellulose nitrate and 75 parts by volume of the solvent. To 8 parts by volume of the resultant solution add $1\frac{1}{2}$ to 2 parts by volume of chemically pure castor oil.

Thus it will be seen that the adhesive is comprised of approximately 80 per cent of the solution before loss of the solvent, and that the adhesive contains between 14 to 21 per cent of castor oil.

In order to produce a coating of the adhesive which is practically dry to the touch, but which has, nevertheless, a slight degree of adhesiveness, such degree being so small that the adhesive will adhere to practically nothing except glass and then only by thoroughly rubbing and pressing the carrier against the glass, the castor oil represents approximately 14 per cent by volume of the adhesive prior to the dissipation of the solvent.

For most purposes however, it is desirable to employ substantially 20 per cent by volume of castor oil, this percentage representing the amount of castor oil by volume in the adhesive prior to the dissipation of the solvent.

However, if the adhesive is to be employed simply as a sensitive-to-pressure adhesive and the carrier or adhesive is not to be impressed, a larger volume of castor oil may be employed,—up to equal parts by volume of castor oil and the above solution. This increased castor oil content will cause the adhesive to adhere to other surfaces than smooth ones, and still pull away (peel) satisfactorily, if there is not a great deal of heat to be encountered, as the direct rays of the summer sun.

The adhesive thus prepared is substantially transparent and may be employed that way. However, if desired, suitable water insoluble coloring matter may be added, such as the alizarin dyes.

The carrier B may comprise a sheet or sheets of a unified cellulose carrier such as paper or cardboard, but may also include cloth or metallic foils, all preferably pliable so that they may be peeled from a surface. The carriers may be transparent, translucent or opaque and where very thin or relatively opaque or transparent carriers are used, the castor oil in the adhesive may be employed to render them practically transparent or more translucent.

The imprint C may comprise any suitable indicia formed with ink or dyes and imprinted upon the carrier or the adhesive with printers' type, pen or the like. The adhesive will be found to be receptive to most inks and dyes but will not cause the ink to run. In one sense, the adhesive itself when suitably colored may comprise a portion of the indicia.

Having prepared the adhesive, the same may be applied by a roller, brush, or any suitable means, as a coating on a face 10 or a portion of a face of a suitable carrier. The solvent will evaporate quickly. When the adhesive is practically dry to the touch, the carrier may be applied to a smooth surface, such as glass, and the adhesive will cause it to adhere there until peeled from said surface, whereupon it will readily come away carrying all of the adhesive with it. It has been found that some sensitive-to-pressure adhesives will peel from a supporting surface but not so as to leave no residue thereon and while this residue may be generally removed, the removal thereof takes time and energy.

Figure 2:
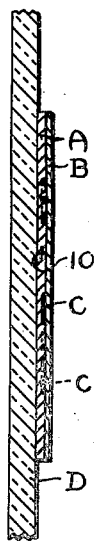
Figure 2 is a view on the line 2—2 of Figure 1.
Figure 6:
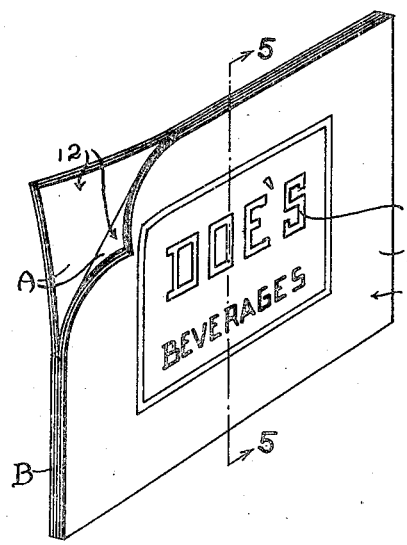
Figure 6 is a perspective view of a partly pulled apart pair of carriers having the confronting faces thereof coated with the improved adhesive and with at least one of the opposite faces of the carriers imprinted.
Figure 5:
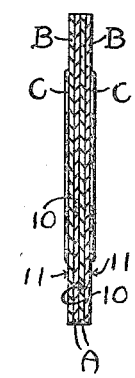
Figure 5 is a view substantially on the line 5—5 of Figure 6.
Figures 3, 4:
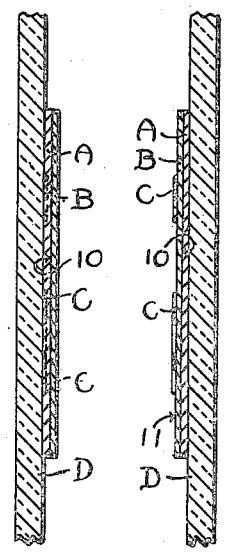
Figure 3 is a vertical section of a carrier provided with a coating of the improved adhesive, with the adhesive imprinted and all suitably secured to a transparency.
Figure 4 is a vertical section of a carrier provided with a coating of the improved adhesive on one side, imprinted upon the other side, and secured to a suitable surface, such as glass.

Since the improved adhesive is receptive to printer's ink and the like, either the carrier may have its face 10 printed upon as shown in Figure 2 and then the same face 10 coated with the adhesive, or, the carrier may be coated with the adhesive upon a face 10 thereof and the adhesive printed upon as shown in Figure 3 or, in a third case, the carrier, suitably coated with the adhesive on one face 10, may have the opposite face 11 printed upon as shown in Figure 4. In all these cases the adhesive contains preferably not over 21 per cent by volume of castor oil as heretofore set out.

As an additional step, when the carrier is of paper or a similar substance which can be readily softened and removed by the application of water, the article of manufacture may be applied as shown in Figure 3 and the carrier then removed by soaking with water and rubbing off, whereupon the adhesive and imprint will remain upon the supporting surface until peeled off in its entirety as a sheet. In fact it may be reapplied by pressure to another suitable supporting surface, and from this it is apparent that the carrier may be removed prior to the initial application of the article of manufacture to its supporting surface, if desired.

It has been found that where suitable adhesive coated carriers employing this improved adhesive may be imprinted, jogged, counted and bundled without inconvenience, if it is desirable to stock the adhesive coated carrier for some time, they should be prepared in pairs with the adhesive coated faces 10 pressed together and the outer faces 11 printed upon since thereby dust cannot gather upon the adhesive nor will there be any appreciable loss of the castor oil by evaporation. When such pairs of carriers are pulled apart, the two coatings of adhesive will peel apart with their outer faces 12 smooth and not at all tacky and the article may be as readily affixed to a surface as in cases heretofore outlined. It is also possible, when handling in this way in pairs to increase the castor oil contents to a considerable extent so that while the two adhesive coatings will peel apart, the article may be affixed to surfaces other than smooth ones such as glass.

The adhesive may be put up in jars or tubes and sold to users who may employ the adhesive as is ordinary paste or mucilage. When so employed, the adhesive is applied to a carrier such as paper, and before it is allowed to become dry to the touch, the carrier may be affixed to a suitable surface, such as paper and will then adhere so that the papers will not pull apart.

Various changes may be made to the forms of the invention herein shown and described, without departing from the spirit of the invention or the scope of the claims.

What is claimed is:

1. As an article of manufacture to be employed to receive both more or less intricate designs upon its adhesive surface, a paper carrier and an imprint-receivable and sensitive-to-pressure adhesive thereon.

2. As an article of manufacture to be employed to receive both more or less intricate designs upon its adhesive surface, a paper carrier and an ink-receivable and ink-spreadless permanently sensitive-to-pressure adhesive thereon.

3. As an article of manufacture, a paper carrier, removable by the application of moisture and friction thereto, a water-insoluble, sensitive-to-pressure adhesive thereon and a design carried by said carrier and in contact with said adhesive.

4. The method of transferring prints capable of being readily peeled from a supporting surface in their entirety, to a supporting surface, which consists in coating an imprinted carrier with a tackyless, sensitive-to-pressure, water-insoluble, pliable adhesive, containing a solvent, allowing the solvent to substantially dissipate, and applying said carrier and coating to a smooth supporting surface with pressure only.

5. The method of transferring prints capable of being readily peeled from a supporting surface in their entirety, to a supporting surface, which consists in imprinting a carrier, coating the carrier over the imprinted side with a transparent tackyless, sensitive-to-pressure, water-insoluble, pliable adhesive, containing a solvent, allowing the solvent to substantially dissipate, and applying said carrier and coating to a smooth supporting surface with pressure only.

6. The steps in the method of transferring prints capable of being readily peeled from a supporting surface in their entirety, to a smooth supporting surface by pressure only, which consists in coating a carrier, capable of becoming pulpy upon the application of moisture thereto, with a sensitive-to-pressure, water-insoluble adhesive containing a solvent, allowing the solvent to substantially dissipate, imprinting upon said coating, and removing said carrier by the application of moisture thereto.

7. An adhesive-coated paper adapted to receive an imprint, comprising a paper stock and an adhesive coating thereon, said coating having as one of its ingredients a plasticizer, said plasticizer also causing said adhesive to have sensitive-to-pressure qualities to enable said paper to be applied to, removed from and reapplied to a smooth surface by pressure alone.

8. An adhesive-coated paper adapted to receive an imprint, comprising a paper stock and an adhesive coating thereon, said coating having as one of its ingredients a plasticizer, said plasticizer being of a volume in excess of its necessary volume as a plasticizer and causing said adhesive to have sensitive-to-pressure qualities to enable said paper to be applied to, removed from and reapplied to a smooth surface by pressure alone.

9. An adhesive-coated paper adapted to receive an imprint made by ordinary printers' inks and the like and to be applied to a smooth surface, such as glass or a second such paper with the adhesives in face-to-face contact, by pressure alone and to be removed and reapplied many times without disturbing the surface smoothness and imprint, comprising a paper stock and a smooth adhesive coating thereon, said adhesive having as one of its ingredients a plasticizer, said plasticizer also giving said adhesive sensitive-to-pressure qualities.

10. An adhesive-coated paper adapted to receive an imprint, comprising a paper stock and a water-insoluble adhesive coating in direct intimate contact with a face of said paper stock, said coating having as one of its ingredients a plasticizer, said plasticizer being present in volume sufficient to provide sensitive-to-pressure qualities to said adhesive and to impart to said adhesive intricate-ink-design-receiving qualities.

11. As an article of manufacture, a pair of paper stock carriers, having the entire confronting faces of each coated with a sensitive-to-pressure adhesive, said adhesive when so coated being adapted to be permanently retained by said carriers and to be affixed to, peeled from and reaffixed to a smooth surface by pressure alone, and with the surface of the coated adhesive on one carrier in intimate contact with the surface of the coated adhesive on the other carrier substantially throughout the extent of said surfaces, the outer faces of said carriers being adapted to receive imprints when said carriers are held together by said sensitive-to-pressure adhesive, whereby said carriers may be printed upon, peeled apart with each coat of adhesive remaining upon its carrier and said carriers affixed to, peeled from and reaffixed to a smooth surface by pressure alone without causing said adhesive to pull from said carrier.

OVERTON W. PENDERGAST.